US012183971B2

(12) United States Patent
Matsue

(10) Patent No.: US 12,183,971 B2
(45) Date of Patent: Dec. 31, 2024

(54) ANTENNA RECEPTION DEVICE AND ELECTRONIC TIMEPIECE

(71) Applicant: CASIO COMPUTER CO., LTD., Tokyo (JP)

(72) Inventor: Takeshi Matsue, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 867 days.

(21) Appl. No.: 17/199,969

(22) Filed: Mar. 12, 2021

(65) Prior Publication Data

US 2021/0305677 A1 Sep. 30, 2021

(30) Foreign Application Priority Data

Mar. 25, 2020 (JP) ................................ 2020-053628

(51) Int. Cl.
*G04R 60/06* (2013.01)
*G04R 20/02* (2013.01)
(Continued)

(52) U.S. Cl.
CPC ............... *H01Q 1/50* (2013.01); *G04R 20/02* (2013.01); *G04R 60/08* (2013.01); *H01Q 1/273* (2013.01); *H01Q 7/00* (2013.01)

(58) Field of Classification Search
CPC ........... H01Q 1/50; H01Q 1/273; H01Q 7/00; H01Q 9/0421; H01Q 1/36; G04R 20/02; G04R 60/08; G04R 20/26; G04R 60/02; G04R 60/06; G04G 17/06; G04G 17/04; G04G 21/04; H05K 1/0213; H05K 1/111
See application file for complete search history.

(56) References Cited

U.S. PATENT DOCUMENTS

2009/0224996 A1 9/2009 Kim et al.
2018/0284700 A1* 10/2018 Nakajima ........... H01Q 9/0407
(Continued)

FOREIGN PATENT DOCUMENTS

JP 2002261533 A 9/2002
JP 2019-086312 A 6/2019
JP 2021152507 A 9/2021

OTHER PUBLICATIONS

Notice of Reasons for Refusal dated May 10, 2022 received in Japanese Patent Application No. JP 2020-053628 together with an English language translation.
(Continued)

*Primary Examiner* — Minh D A
(74) *Attorney, Agent, or Firm* — Scully, Scott, Murphy & Presser, P.C.

(57) ABSTRACT

Provided is an antenna reception device including an antenna, a board including three or more electrodes, and two connectors that respectively connect two of the electrodes to the antenna. The electrodes include a first electrode that is connected to a ground and a second electrode that is connected to a feed point. The board includes a first signal line between the ground and the first electrode and a second signal line between the feed point and the second electrode. The electrodes include two or more first electrodes and/or two or more second electrodes, and the board includes two or more respective first signal lines with different lengths and/or two or more respective second signal lines with different lengths.

13 Claims, 3 Drawing Sheets

(51) Int. Cl.

| | |
|---|---|
| ***G04R 60/02*** | (2013.01) |
| ***G04R 60/04*** | (2013.01) |
| ***G04R 60/08*** | (2013.01) |
| ***H01Q 1/27*** | (2006.01) |
| ***H01Q 1/50*** | (2006.01) |
| ***H01Q 7/00*** | (2006.01) |

(56) References Cited

U.S. PATENT DOCUMENTS

| | | | | |
|---|---|---|---|---|
| 2019/0036220 | A1 * | 1/2019 | Paulotto | H01Q 9/045 |
| 2019/0129364 | A1 * | 5/2019 | Tasaka | H01Q 7/00 |
| 2020/0044316 | A1 * | 2/2020 | Ruaro | H01Q 1/243 |

OTHER PUBLICATIONS

Notice of Reasons for Refusal dated May 28, 2024 received in Japanese Patent Application No. JP 2022-108068.

* cited by examiner

ANTENNA RECEPTION DEVICE AND ELECTRONIC TIMEPIECE

CROSS-REFERENCE TO RELATED APPLICATIONS

This application is based upon and claims the benefit of priority under 35 USC 119 of Japanese Patent Application No. 2020-053628 file on Mar. 25, 2020, the entire disclosure of which, including the description, claims, drawings, and abstract, is incorporated herein by reference in its entirety.

BACKGROUND OF THE INVENTION

Field of the Invention

The present disclosure relates to an antenna reception device and an electronic timepiece.

Description of the Related Art

Some small portable terminal devices such as electronic wristwatches receive radio waves in the gigahertz band such as those from positioning satellites. An antenna in such devices is not supposed to protrude outward, and may be provided on the surface or periphery of the case.

Such an antenna is fixed and its size is limited depending on the size of the case. A desired resonance frequency may be obtained by wiring connection of the antenna with a feed point and a ground connecting point determined according to the frequency to be received. Thus, when the internal components or external design of the product are changed, it may be necessary to adjust the positioning of wiring connection. In order to easily deal with such a situation, JP 2019-086312 A discloses a technique in which multiple electrodes are provided beforehand on a circuit board and an antenna is connected to selected electrodes.

Problems to be Solved by the Invention

However, considering impedance matching, etc., it is impossible to properly obtain a reception sensitivity at a desired frequency only by adjusting the connection positioning.

An object of the present invention is to provide an antenna reception device and an electronic timepiece that can more properly define a reception sensitivity at a frequency of radio waves to be received of a product.

BRIEF SUMMARY OF THE INVENTION

In order to solve at least one of the abovementioned problems, an antenna reception device and electronic timepiece according to an aspect of the present invention includes:

- an antenna;
- a board including three or more electrodes; and
- two connectors that respectively connect two of the electrodes to the antenna,
- wherein the electrodes include a first electrode that is connected to a ground and a second electrode that is connected to a feed point,
- wherein the board includes a first signal line between the ground and the first electrode and a second signal line between the feed point and the second electrode, and
- wherein the electrodes include two or more first electrodes and/or two or more second electrodes, and the board includes two or more respective first signal lines with different lengths and/or two or more respective second signal lines with different lengths.

DETAILED DESCRIPTION OF THE INVENTION

Hereinafter, an embodiment of the present invention is described with reference to the drawings.

Figure 1:
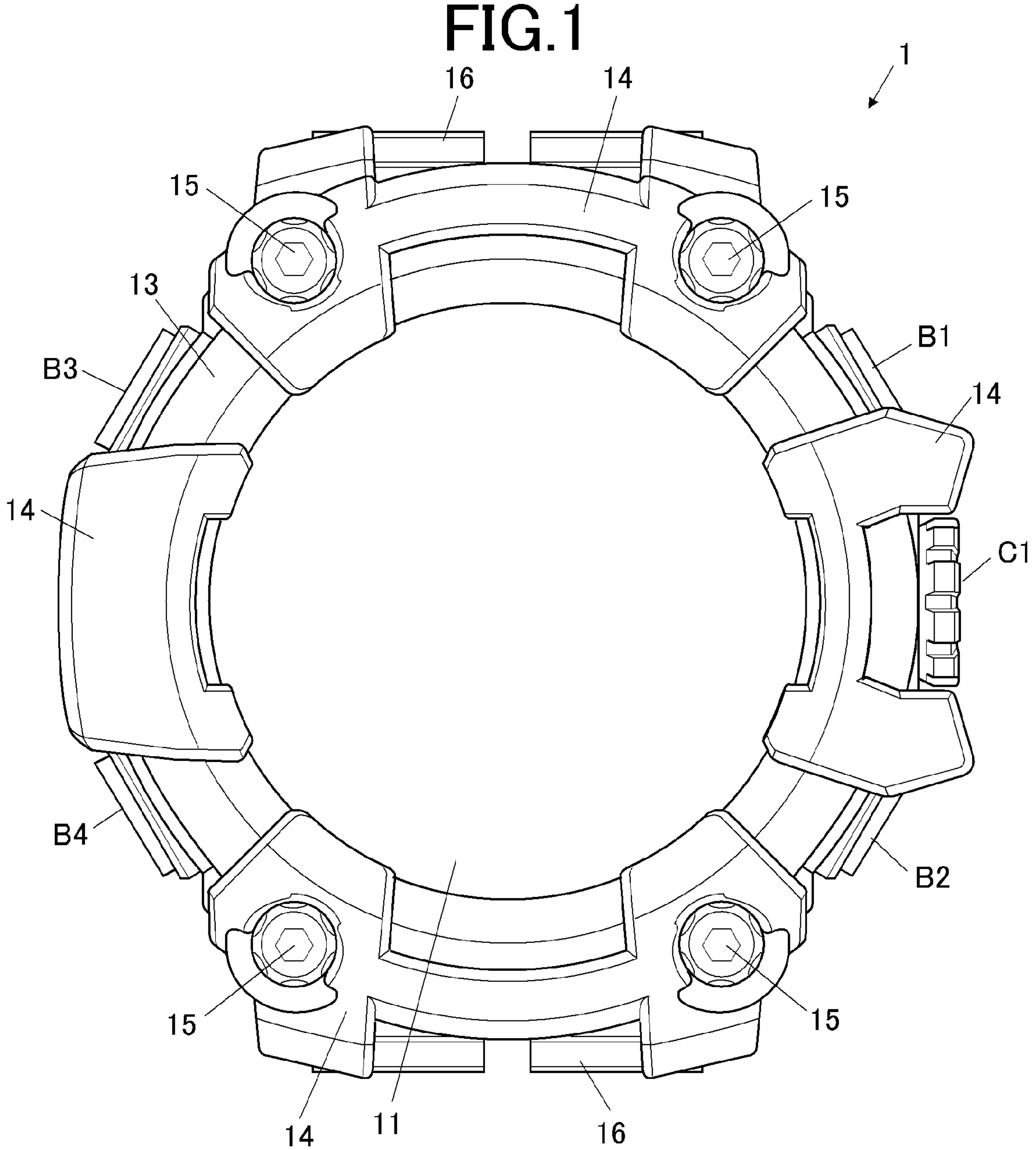
FIG. 1 is a plan view showing an external appearance of an electronic timepiece.

FIG. 1 is a plan view showing an external appearance of an electronic timepiece 1.

An upper surface of the electronic timepiece 1 includes a display unit 11 in the center and a bezel 13 around the display unit 11. The electronic timepiece 1 includes an exterior member 14 covering part of the bezel 13 and a connecting member 16 connecting a belt to the main body. Push-button switches B1 to B4 and a crown Cl are provided on the lateral face of the electronic timepiece 1. The exterior member 14 is fixed onto a case 12 (see FIGS. 2 and 3) with screws 15. Along with this, the bezel 13 is fixed between the exterior member 14 and the case 12.

The exterior member 14 protects the main body of the electronic timepiece 1 including the push-button switches B1 to B4 and the crown Cl with its intrusions and protrusions. The material of the exterior member 14 may be resin, for example.

The bezel 13 is a conductor member (usually a metal member) of an annular structure. The bezel 13 functions as an antenna in the electronic timepiece 1. The antenna receives right-handed circularly polarized waves from positioning satellites (mainly satellites concerning GPS (Global Positioning Satellite/System).

The push-button switches B1 to B4 and the crown Cl penetrate the lateral face of the case 12 and protrude outward. The push-button switches B1 to B4 may be pushed, and the crown Cl may be pulled out and rotated.

The display 11, which includes a digital display, performs digital display.

Figure 2:
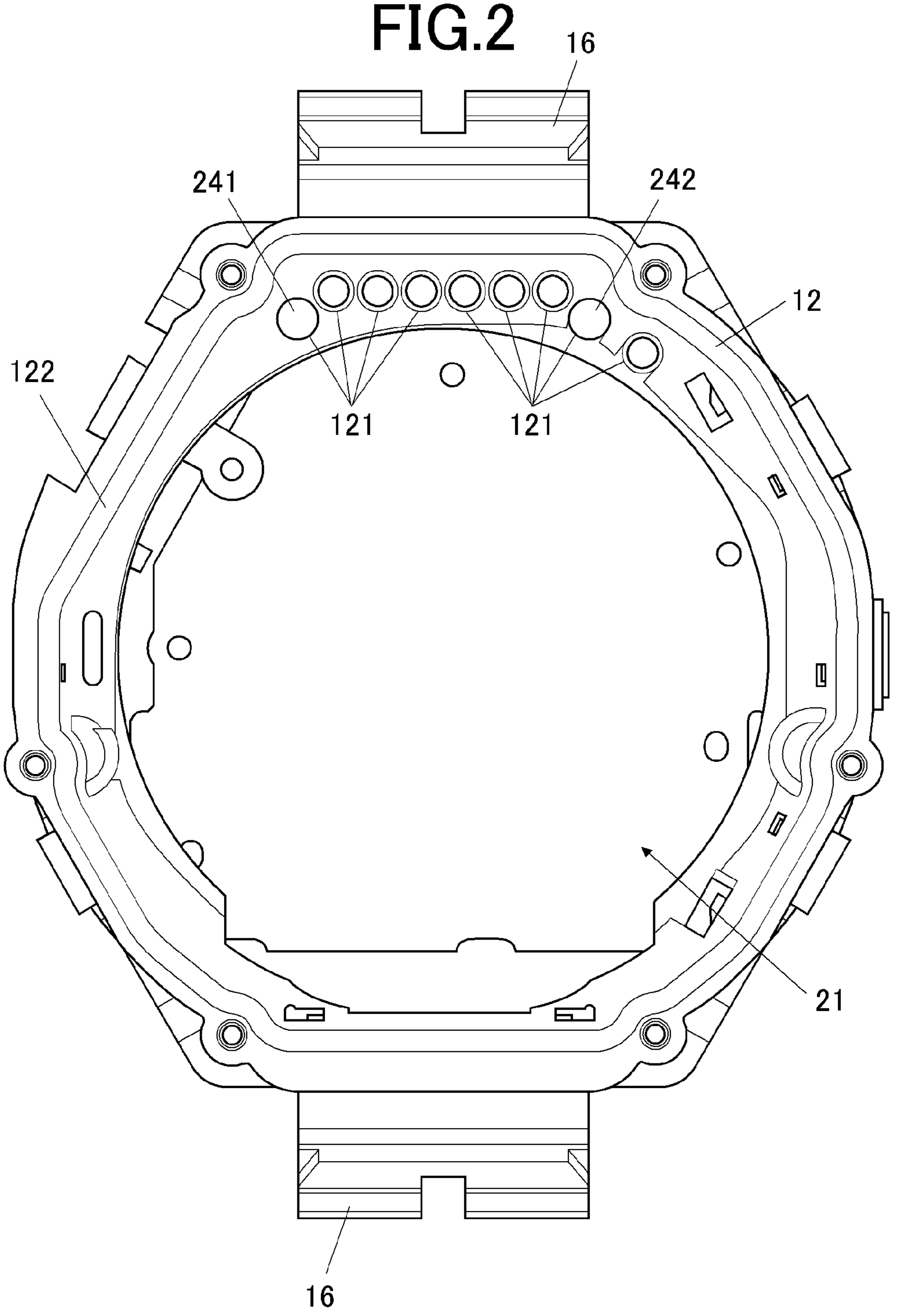
FIG. 2 shows a relationship between a case and a board.

FIG. 2 shows a relationship between the case 12 and the circuit board 21. FIG. 2 is also a plan view from above like FIG. 1.

Figure 3:
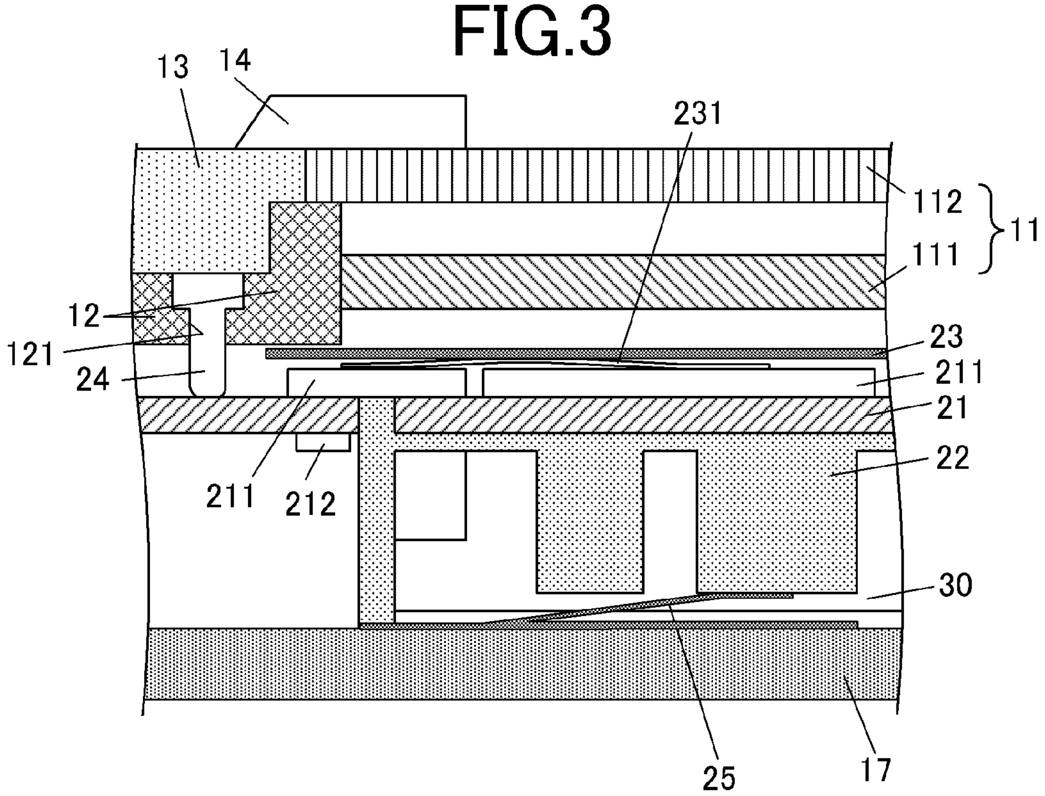
FIG. 3 shows part of a cross section including a connection pin inside the case.

The case 12 includes a substantially cylindrical structure inside to house and protect an operation module such as the circuit board 21 and a battery 30 (see FIG. 3). The penetrating holes of the connecting members 16 described above are provided on the lateral face of the case 12.

Nine penetrating holes 121 are provided near the inner edge of the case 12. Connection pins 241 and 242 (connector, also referred to as a connecting pin(s) 24 individually or collectively) are inserted in two of the penetrating holes 121. The connection pins 241 and 242 each connect the bezel 13 as an antenna with either one of connection pads P1 to P9. The connection pins 241 and 242 are not necessarily joined (fixed) with the case 12 or any other part. As will be described later, the connection pin 241 transmits a reception signal from an end in contact with the bezel 13 as a feed point to the reception circuit connected via a signal line with the other end. The connection pin 242 is connected to a ground G (see FIG. 4) on the circuit board 21.

The case 12 includes an insertion groove 122 for a ring on the outer side compared to the penetrating holes 121, and the case is waterproof by being fixed in contact with the bezel 13 or the exterior member 14 with a ring being inserted into the insertion groove 122.

FIG. 3 shows part of a cross section including one of the connection pins 24 inside the case 12.

A display screen 111 and a light-transmitting (usually transparent) protection layer 112 (lens) that covers the display screen 112 are above a circuit board 21 with a metal frame 23 between the display screen 111 and the circuit board 21. A battery 30 is fixed and supported by a frame 22 under the circuit board 21. The lowermost face is covered with a back cover 17.

Part of the circuit on the circuit board 21, for example, a CPU that functions as a controller performing control operations such as clocking, displaying, and correcting of date and time and a radio wave reception circuit are covered with a shielding case 211. The shielding case 211 is a conductor in a box-shaped structure for protecting inside elements, etc. from electromagnetic waves and static electricity. Other components on the circuit board 21 such as an oscillator circuit, a clocking unit for clocking the current date and time (current time), and a non-volatile memory may be outside the shielding case 211.

Part of the circuit 212, a reception circuit relating to Bluetooth (registered trademark) may be under the circuit board 21.

The metal frame 23 includes a conductor plate for protecting the circuits on the circuit board 21 from static electricity. The metal frame 23 is in contact with the shielding case 211 at a leg-shaped part 231, and is connected to the ground on the circuit board 21 via the shield case 211. The metal fame 23 is inside the inner edge of the bezel 13.

The display screen 111 is, for example, a liquid crystal display screen, but is not limited to it. Any type of screen may be used. The display screen 111 displays various kinds of information based on the control signals from the controller on the circuit board 21.

Each of the connection pins 24 inserted into one of the penetrating holes 121 of the case 12 may be in a spring structure elastic in the extending direction. In the electronic timepiece 1 assembled and sealed, the connection pin 24 is in contact with the circuit board 21 and the bezel 13 at both ends respectively in a compressed state. This maintains contact at both ends in the connection pins 24 by the tension of spring even when some impact is applied to the electronic timepiece 1. The width of the penetrating hole 121 is two steps, and the head shape of the connection pin 24 fits those steps, preventing a position shift in the left-right direction.

The bezel 13, which is outside the case 12, functions as an antenna. The bezel 13 in a loop shape is connected to the circuits on the circuit board 21 at two points with the connection pins 241 and 242, as described above. The bezel 13 is connected to the ground at one of the two points, and to the feed point at the other point. With such a structure, the bezel 13 functions as a patch-shaped microstrip antenna, paired with the ground on the circuit board 21.

The frame 22, which is formed of a conductor at least partially, fixedly holds the battery 30 inside for protection, and contacts the ground of the circuit board 21 and the back cover 17 to extend the range of the ground to the back cover 17. As shown in FIG. 3, the frame 22 does not necessarily cover the whole lateral face of the battery 30. The frame 22 and the back cover 17 may be connected to one another via a plate spring 25 of a conductor material (metal, etc.) with a higher stability and lower resistance (lower impedance) electrically.

The battery 30 is connected to a power supply terminal of the circuit board 21 and supplies power to the circuits of the circuit board 21. The battery 30 may be detachable and replaceable, or may be fixed onto the frame 22. The battery 30 may be charged by a solar panel not shown in the drawings or by an externally connected terminal.

Figure 4:
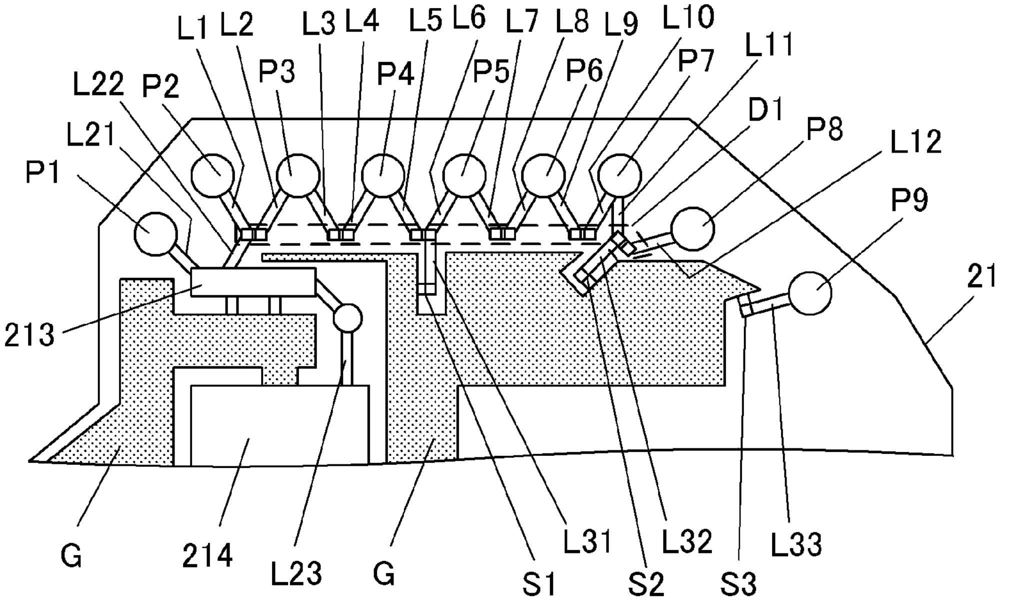
FIG. 4 shows connection of connection pins on the circuit board.

FIG. 4 shows connection of the connection pins 24 on the circuit board 21.

Multiple (three or more, nine in this embodiment) connection pads P1 to P9 (electrodes) are provided corresponding to the positions of the penetrating holes 121 on the circuit board 21. The connection pads P2 to P8 are connected to one another with lines L1 to L12 (relay lines) via lumped-element circuits D1 (disconnector). The lumped-element circuits D1, which are each an RLC (resistor, inductor, and capacitor) circuit, may may be selectively switched between a non-conductive state and a conductive state. The switching may be irreversible.

The lumped-element circuits D1 are not on a straight line connecting the neighboring connection pads, but is apart from that line. Because of this, the lines connecting the connection pads are in polyline. Though the distance (direct distance) between the pads is short for saving space, the lines are extended in length by a structure in polyline.

The line L21 connected to the connection pad P1 and the line L22 between the connection pads P2 and P3 are each included in a path of the signal line connected to a reception circuit 214 (including a front end with a low noise amplifier (LNA), a band pass filter (BPF), etc. and a radio wave reception control driver (with a baseband circuit of the back end, etc.) via an impedance matching circuit 213 and a line L23. The line L31 between the lines L5 and L6, the line L32 between the lines L11 and L12, the line L33 between the L32 and the connection pad P9 are connected to the ground G via the connection sections S1 to S3, respectively.

Thus, the connection pads P1 to P8 (at least two second electrodes) are electrodes each connectable to the feed point, and the signal line is connected to the impedance matching circuit 213 with the part of the lines L21, L22, and L1 to L12 that is determined (configurable) corresponding to the selected connection pads. The signal line is connected to the reception circuit 214 via the impedance matching circuit 213. The connection pads P2 to P9 (at least two first electrodes) can be connected to the ground G via the part of the lines L1 to L12, and L31 to L33 determined corresponding to the selected connection pads and the connection sections S1 to S3. There is always at least one of the connection pads that can be connected to the connection pin 242 with the connection pin 241 being connected to one of the connection pads P1 to P8. Similarly, there is always at least one of the connection pads that can be connected to the connection pin 241 with the connection pin 242 being connected to one of the connection pads P2 to P9. The length of the wiring on the path to the impedance matching circuit 213 (a second distance) and the length of the wiring on the path to the ground G (a first distance) may be different from each other depending on the combination of the selected connection pads and the selection of the connection sections S1 to S3 to the ground G (that is, the number of the connection pads connected in between). For example, in an example of FIG. 3, the connection pin 241 is connected to the connection pad P1, and is connected to the impedance matching circuit 213 via the line L21 only. The connection pin 242 is connected to the connection pad P8, and is connected to the ground G via the lines L12 and L32.

The connection pads P2 to P8 can be connected to both the ground G and the impedance matching circuit 213 (serving as both the first electrode and the second electrode). Thus, the conduction may be disconnected from unnecessary part of the lumped-element circuits D1 and the connection sections S1 to S3 depending on actually selected ones of the connection pads P2 to P8.

The distances from the connection pad P4, P5, P7, and P8 to the ground G are equal, but the selection makes it possible to change the distance (the angle between the lines from the pins to the center of the bezel 13) between the connection pins 241 and 242 on the bezel 13. The resonance frequency may be adjusted according to the distance (angle).

As described hereinbefore, it is possible to adjust more properly the resonance frequency and the phase difference of the radio waves received by the bezel 13 by adjusting the positional relationship of the connection pins 241 and 242, the distance between the connection pin 241 and the impedance matching circuit 213, and the distance between the connection pin 242 and the ground G. These may be varied by the lumped-element circuits D1, the connection pins 24, etc. Thus, it is possible to properly make subtle adjustments.

Among the components described above, the bezel 13, the connection pins 24, and at least part of the circuit board 21 forms an antenna reception device in this embodiment.

As described hereinbefore, the electronic timepiece 1 including the antenna reception device in this embodiment includes the bezel 13 that receives radio waves, the circuit board 21 including three or more connection pads P1 to P9, and the connection pins 24 connecting two of the connection pads P1 to P9 with the bezel 13. The circuit board 21 includes the two or more first electrodes connectable to the ground and/or the two or more second electrodes connectable to the feed point. With the two or more first electrodes (the connection pads P2 to P9), the first signal line from the first electrode to the ground G is different for each of the two or more first electrodes, and with the two or more second electrodes (the connection pads P1 to P8), the second signal line connected to the second electrodes is different for each of the two or more second electrodes.

With such a configuration, it is possible to more easily and more properly adjust the resonance frequency of the reception device to the frequency of radio waves to be received by the antenna and match the impedances just by adjusting the connection pins 24 and selecting the connection pads P1 to P9 in the electronic timepiece 1 (antenna reception device), so that radio waves at a desired wavelength can be received with a higher reception sensitivity. This makes it possible to easily maintain the wave reception in a good state without changing the overall design even in the case where the circuit board 21 or the case 12 is replaced for an improvement or model change. The configuration also makes it possible to more easily and more appropriately correct a minute deviation from design values. Thus, it is possible to receive desired waves at a more stable and more appropriate sensitivity in the electronic timepiece 1.

That is, in view of the impedance matching, etc., it is impossible to properly obtain the reception sensitivity at a desired frequency just by adjusting the positioning of connection as disclosed in the prior art. However, according to this embodiment, it is possible to more properly set the reception sensitivity at a frequency of the radio waves to be received of a product.

The circuit board 21 includes two or more first electrodes or two or more second electrodes as selectable electrodes, and when one of the connection pins 24 (for example, the connection pin 241) is connected to one of the selectable electrodes (for example, the second electrodes), one or more electrodes (for example, the first electrode) other than the selectable electrodes is connectable to another of the connection pins 24 (for example, the connection pin 242).

This makes it possible to adjust the resonance frequency of the reception device to the frequency of radio waves to be received by the bezel 13 and match the impedances according to the selected first electrode and second electrode in the electronic timepiece 1.

The connection pads P1 to P9 are positioned such that a distance between points on the bezel 13 at which the bezel 13 is connected to the connection pins 24 are changeable according to a combination of the first electrode that connects the ground to the bezel 13 by the connection pin 242 and the second electrode that connects the feed point to the bezel 13 by the connection pin 241.

That is, as the distance between the connection pins 241 and 242 on the bezel 13 (antenna) is adjustable, it is possible to match the frequency of waves to be received and the resonance frequency.

The wiring includes the lines L1 to L12 (relay lines) connecting the connection pads P2 to P8, and the paths of the signal lines from the bezel 13 to the ground G and the reception circuit 214 via the connection pads P2 to P8 can be set. The first line distance and the second line distance are changed according to the number of the connection pads connected. That is, it is not necessary to install more lines than necessary on the circuit board by sharing a long line(s) with other line(s), saving trouble in manufacturing and space in structure.

The relay line connects the connection pads P2 to P8 in a polyline or with a curve. It is difficult to keep a distance between the connection pads P2 to P8 in view of the size of the electronic timepiece 1 or the circuit board 21, and the accuracy of adjustment of the frequency and the impedance matching. Thus, as the relay lines are not linear, a longer distance of the wiring can be obtained. The distances to the ground G and the impedance matching circuit 213 can be adjusted in a wide range. The adjustment is easier in this way, particularly in the case where the circumference is not long enough to obtain the frequency of the radio waves to be received.

At least part of the connection pads P2 to P8 serve as both the first electrode and the second electrode. The wiring includes the lumped-element circuits D1, and one of the paths of the signal lines from the part of the connection pads P2 to P8 to the ground G and to the reception circuit 214 can be disconnected by one of the lumped-element circuits D1. As described above, it is possible not to apply a current in an unnecessary direction while the impedances are matched by the lumped-element circuits D1, and the lines to the ground G and to the power feed may be shared partially. The electricity may be conducted in a direction as necessary. This makes it possible to save the number, the space, and the difficulty in formation of the lines at least partially to a greater extent in the electronic timepiece 1.

The path of the signal line from the second electrode is connected to the radio wave reception control driver of the reception circuit 214 via the impedance matching circuit 213. That is, it is possible not only to adjust the length corresponding to the resonance frequency but also to properly match the impedances and the phase difference for signal reception. Therefore it is possible to receive desired radio waves with a higher sensitivity while preventing unnecessary loss.

The bezel 13 is annular (loop shape). With an annular antenna at a length corresponding to the wavelength of waves to be received, it is possible to receive radio waves efficiently without disturbing other components in a mobile terminal device which has a display 11 in the center on the front surface.

The electronic timepiece 1 in this embodiment includes a configuration as the antenna reception device described above, the clocking unit that clocks the current time, and the controller that corrects the current time clocked by the clocking unit based on the radio waves received by the antenna reception device. Thus, the electronic timepiece 1 can receive radio waves more properly to maintain accurate clocking of the current date and time and perform various functions, while the weight, size, or power consumption is suppressed at least partially.

The present disclosure is not limited to the above embodiment, and may be modified in various ways. For example, the bezel 13 serves as the antenna in the above embodiment. However, another annular member may be a substitute, or a separate antenna may be provided.

In the above embodiment, the distances from the connection pads connected to the connection pins 24 with the lines between the connection pads P2 to P8 to the impedance matching circuit 213 and to the ground G are changeable, but the pattern of wiring is not limited to that. For example, the connection pads P2 to P8 may be connected to either one of the impedance matching circuit 213 and the ground G so that the distance to the connected one is only changeable. It is sufficient that the length of the line is changeable according to the selected connection pad. For example, the connection pads P2 to P8 may be connected directly to the impedance matching circuit 213 and the ground G without other connection pads in between with lines different from each other in length. The wiring is in a polyline bending at the lumped-element circuits D1 respectively disposed between the neighboring pairs of the connection pads P2 to P8. However, the lines may bend at other points with curves or may asymptotically approach a common line connected with the lumped-element circuits D1.

In the above embodiment, the connection pads P1 and P9 are respectively connected to the impedance matching circuit 213 and the ground G exclusively, but the wiring may not include such dedicated sections. On contrary, connection pads connected exclusively to the impedance matching circuit 213 and to the ground G may be separately provided, and the number of the connection pads connected to at least one of them may be two or more. The number of the connection pads may be modified according to the required accuracy, the adjustment width, or the width for arrangement of the connection pads (angle range). The connection pads P2 to P7 may not be arranged in a straight line, and may be arranged in an arc.

In the above embodiment, the connection pins 24 connect the bezel 13 with the connection pads P1 to P9 at the overlapping positions in a plan view. However, the positions do not necessarily overlap as long as the positional relations between the connecting points on the bezel 13 and the connection pads P1 to P9 are appropriate.

In the above embodiment, the circular connection pads P1 to P9 are distinctly different from the linear lines. However, the sections for the connection pads and the lines may be continuous as long as the connection points with the connection pins 24 are appropriate and the lumped-element circuits D1 are appropriately positioned.

In the above embodiment, the penetrating hole 121 is provided on the case 12, but may be connected to a plate surface attached to the case 12. The number of the penetrating holes may be different from the number of the connection pads as long as the connection position between the bezel 13 and the connection pads P1 to P9 can be easily maintained.

In the above embodiment, the annular bezel 13 is the antenna. However, the above configuration may be applied to an antenna of a similar structure in which the resonance frequency is adjusted by the feed point and the ground, for example, a microstrip antenna.

In the above embodiment, the electronic timepiece 1 receives radio waves from the positioning satellites, but the present invention is not limited to this. The technique disclosed above may be applied to an electronic device which is not large enough to have an antenna protruding outward but which has an antenna sized to fit the device to receive microwaves, especially radio waves in the gigahertz band. The present invention is not necessarily used for correction of the current date and time in an electronic timepiece. It may be applied to a positioning operation in an electronic timepiece with a positioning function.

Besides, the specific details of the configuration, processes, and steps described in the above embodiment can be appropriately modified without departing from the scope of the present invention.

One or more embodiments have been described hereinbefore. However, the scope of the present invention is not limited thereto, and includes the scope of claims below and the scope of their equivalents.

What is claimed is:

1. An antenna reception device comprising:
- an antenna;
- a board including three or more electrodes; and
- two connectors that respectively connect two of the electrodes to the antenna,
- wherein the electrodes include a first electrode that is connected to a ground and a second electrode that is connected to a feed point,
- wherein the board includes a first signal line between the ground and the first electrode and a second signal line between the feed point and the second electrode,
- wherein the electrodes include two or more first electrodes and/or two or more second electrodes, and the board includes two or more respective first signal lines with different lengths and/or two or more respective second signal lines with different lengths,
- wherein the board includes a relay line between the electrodes,
- wherein a path of the first signal line and a path of the second signal line are each settable to include the relay line and the electrodes connected in between, and
- wherein a length of the first signal line and a length of the second signal line are each changeable by changing a number of the electrodes included in the first signal line or the second signal line.

2. The antenna reception device according to claim 1,
- wherein the board includes the two or more first electrodes or the two or more second electrodes as selectable electrodes,
- wherein the electrodes include one or more electrodes other than the selectable electrodes, and
- wherein the electrodes are configured such that when one of the two connectors is connected to one of the selectable electrodes, the one or more electrodes other than the selectable electrodes is connectable to another of the two connectors.

3. The antenna reception device according to claim 2, wherein the electrodes are positioned such that a distance between points on the antenna at which the antenna is connected to the connectors are changeable according to a combination of a first electrode that connects the ground to the antenna by one of the connectors and a second electrode that connects the feed point to the antenna by another one of the connectors.

4. The antenna reception device according to claim 2, wherein the board includes a relay line between the electrodes, wherein a path of the first signal line and a path of the second signal line are each settable to include the relay line and the electrodes connected in between, and wherein a length of the first signal line and a length of the second signal line are each changeable by changing a number of the electrodes included in the first signal line or the second signal line.

5. The antenna reception device according to claim 2, wherein at least a part of the electrodes is settable to any of the first electrode and the second electrode, and wherein the board includes a disconnector capable of disconnecting a path of the first signal line to the ground or a path of the second signal line to the feed point from the part of the electrodes.

6. The antenna reception device according to claim 1, wherein the electrodes are positioned such that a distance between points on the antenna at which the antenna is connected to the connectors are changeable according to a combination of a first electrode that connects the ground to the antenna by one of the connectors and a second electrode that connects the feed point to the antenna by another one of the connectors.

7. The antenna reception device according to claim 6, wherein the board includes a relay line between the electrodes, wherein a path of the first signal line and a path of the second signal line are each settable to include the relay line and the electrodes connected in between, and wherein a length of the first signal line and a length of the second signal line are each changeable by changing a number of the electrodes included in the first signal line or the second signal line.

8. The antenna reception device according to claim 6, wherein at least a part of the electrodes is settable to any of the first electrode and the second electrode, and wherein the board includes a disconnector capable of disconnecting a path of the first signal line to the ground or a path of the second signal line to the feed point from the part of the electrodes.

9. The antenna reception device according to claim 1, wherein the relay line connects the electrodes in a polyline or with a curve.

10. The antenna reception device according to claim 1, wherein at least a part of the electrodes is settable to any of the first electrode and the second electrode, and wherein the board includes a disconnector capable of disconnecting a path of the first signal line to the ground or a path of the second signal line to the feed point from the part of the electrodes.

11. The antenna reception device according to claim 1, wherein the second signal line from the second electrode is connected to a radio wave reception control driver via an impedance matching circuit.

12. The antenna reception device according to claim 1, wherein the antenna has a loop shape.

13. An electronic timepiece comprising:

the antenna reception device according to claim 1;

a clocking unit configured to clock a current time; and a controller configured to correct the current time clocked by the clocking unit based on a radio wave received by the antenna reception device.

* * * * *